Dec. 22, 1953     N. W. McCURDY     2,663,096
EDUCATIONAL TOY
Filed May 11, 1951

INVENTOR.
Nan Webster McCurdy
BY Edward M. Shealy
Her Attorneys

Patented Dec. 22, 1953

2,663,096

UNITED STATES PATENT OFFICE 2,663,096

EDUCATIONAL TOY

Nan Webster McCurdy, Coral Gables, Fla.

Application May 11, 1951, Serial No. 225,874

1 Claim. (Cl. 35—70)

The present invention relates to educational toys and more particularly this invention relates to toy blocks which are useful in teaching arithmetic or mathematics.

One object of the present invention then is to provide a device of the character described which may be used by a child to teach himself arithmetic or mathematics and which is also a useful aid for a teacher who is teaching arithmetic or mathematics.

Another object of the present invention is to provide a device of the character described which will make the learning of arithmetic or mathematics a game and provide amusement for a child while he is learning.

Still another object of the present invention is to provide a device of the character described which will be a most useful aid in assisting a child to learn to count.

Another object of the present invention is to provide a device of the character described which will be a self-teaching toy which will teach a child to develop number sense through play.

Still another object of the present invention is to provide error control means which will enable a child to learn more quickly and easily and which will prevent him from making mistakes.

Yet another object of the present invention is to provide a device of the character described for teaching arithmetic or mathematics which is very simple, efficient and by means of which, arithmetic or mathematics can be taught visually and concretely.

With the above and other objects in view as will appear as the description proceeds, the invention consists in the novel construction, combination and arrangement of parts, as hereinafter more specifically set forth, claimed and shown in the accompanying drawings, which form a part of this application for Letters Patent.

In the accompanying drawings I have illustrated preferred and practical embodiments of my invention, it being understood, however, that the drawings are merely illustrative and that my inventive-concept is susceptible of other embodiments and utilizations, and that the illustrated embodiments likewise are susceptible of a wide range of variation and modification, without departing from the spirit of my invention or the scope of the appended claim.

In these drawings which accompany and form a part of this specification, and in which like reference numerals are used to designate the same or like parts throughout the several figures.

Figure 1:
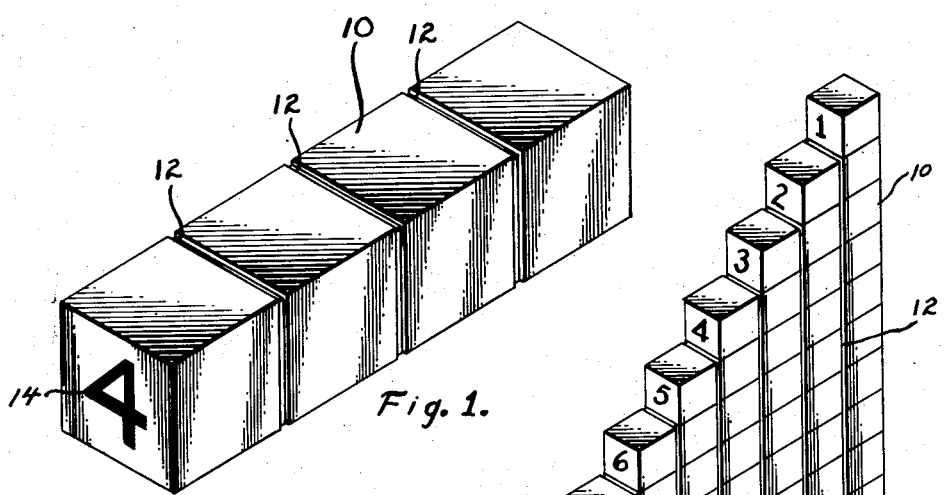
Fig. 1 is a perspective view of the new and novel toy blocks of my invention.
Figure 2:
Fig. 2 is a perspective view of a set of the toy blocks of my invention piled one on top of the other with the longest on the bottom and the shortest on the top; and, Fig. 3 is a plan view showing how the blocks of my invention are placed on the error control blueprint of my invention.
Figure 3:
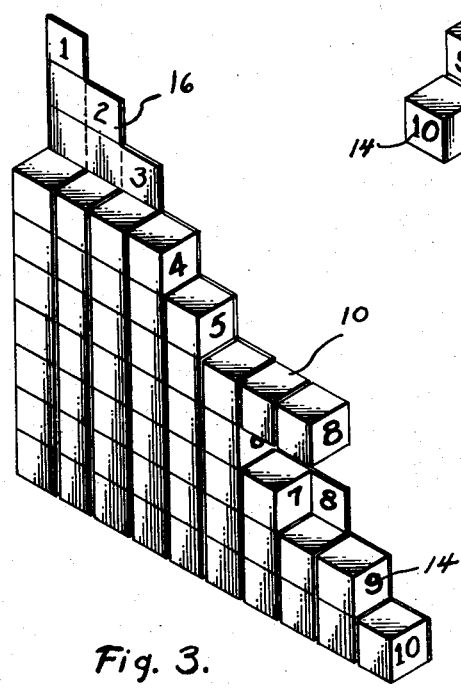

Referring now in detail to the drawings, the reference numeral 10 has been used to generally designate the new and novel toy blocks of my invention. The block 10 may be made from any desired material, such as, for example, wood, plastic, metal, rubber or any other desired material. Preferably, the block 10 is made rectangular in shape, although it is to be understood that other shapes and forms might also be satisfactorily used. The blocks 10 are made in various lengths and preferably a set of them will contain various lengths of blocks 10 running in size from one unit to and including, ten units long. Fig. 1 illustrates the four unit block, and it will be noted from this and from Figs. 2 and 3 that each unit of length of any particular block is marked by grooves or channels 12, which run around the periphery of the block 10 as is shown most clearly in Fig. 1. If desired, one or both ends of the blocks 10 may be marked with the number of units long that block is, for example, in Fig. 1 the four unit block is marked with the numeral 4. The error control blueprint which has been generally designated by the reference numeral 14 is shown in use in Fig. 3. The error control blueprint comprises a sheet which is blocked off into squares or rectangles 16, which correspond exactly in size with the unit sizes of the blocks 10. The error control blueprint provides a method of easily and quickly teaching the child the errors he may have made and what must be done to correct them. A more detailed explanation of its use follows hereafter.

To illustrate some of the ways in which the present invention may be used to develop a number sense in a child the following are given by way of examples:

For instance, a child may be told to assemble the blocks in a pile with one piled on the other and each shorter than the next below and the check sheet applied to the side of the pile, and the errors in assembly, if any, pointed out. In another manner of teaching, any two blocks of different lengths may be placed side by side and the child taught to pick out the block of unit length to make the two lines of equal lengths.

It is to be understood that the forms of my invention herein shown and described are to be taken as preferred and practical embodiments of the same, and that various changes may be made in the shape, size and arrangement of parts without departing from the spirit of my invention or the scope of the appended claim.

Having thus described my invention, what I claim and desire to secure by Letters Patent is:

An educational toy consisting of a set of ten square prismatic blocks graduated in lengths from one to ten and shaped to provide cubical units, the units of each of the blocks of more than one unit being defined one from the other by deep slots on all four sides of the respective prism, in combination with a rectangular check sheet having delineated thereon a side view of a pile of said units arranged in unitarily decremental layers from a layer of ten unit lengths at one edge of the sheet to a layer of single unit length adjacent to opposite edge of said sheet, each of said prisms bearing an index number corresponding to the unitary length of the prism to which it is applied and each layer on the check sheet having a similar length indicating number impressed on the sheet.

NAN WEBSTER McCURDY.

References Cited in the file of this patent

UNITED STATES PATENTS

| Number | Name | Date |
| --- | --- | --- |
| 101,179 | Swift | Mar. 22, 1870 |
| 1,151,279 | Lewis | Aug. 24, 1915 |
| 1,286,462 | Wesche | Dec. 3, 1918 |
| 1,354,910 | Ketchum | Oct. 5, 1920 |
| 1,471,437 | Wood | Oct. 23, 1923 |
| 1,594,376 | Passmore | Aug. 3, 1926 |
| 2,494,497 | Trapnell | Jan. 10, 1950 |

FOREIGN PATENTS

| Number | Country | Date |
| --- | --- | --- |
| 127,567 | Great Britain | Aug. 14, 1929 |